United States Patent
Kawaoka et al.

(10) Patent No.: US 8,579,994 B2
(45) Date of Patent: Nov. 12, 2013

(54) METHOD FOR PRODUCING A SOLID-STATE CELL AND A SOLID-STATE CELL

(75) Inventors: Hirokazu Kawaoka, Nisshin (JP); Hiroyasu Kado, Toyota (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 679 days.

(21) Appl. No.: 12/674,611

(22) PCT Filed: May 11, 2009

(86) PCT No.: PCT/JP2009/058756
§ 371 (c)(1),
(2), (4) Date: Apr. 27, 2010

(87) PCT Pub. No.: WO2010/131321
PCT Pub. Date: Nov. 18, 2010

(65) Prior Publication Data
US 2012/0115018 A1    May 10, 2012

(51) Int. Cl.
*H01M 10/0585* (2010.01)
*H01M 10/0562* (2010.01)

(52) U.S. Cl.
USPC ............................. 29/623.1; 429/162; 419/6

(58) Field of Classification Search
USPC .......... 429/86, 249, 162, 252, 320, 303, 144; 419/6; 29/623.1, 623.5
See application file for complete search history.

(56) References Cited

U.S. PATENT DOCUMENTS 4,105,831 A * 8/1978 Plasse .............................. 429/86
6,096,456 A * 8/2000 Takeuchi et al. .............. 429/249
6,284,412 B1 * 9/2001 Minakata et al. ............. 429/303
2001/0036573 A1 * 11/2001 Jen et al. ....................... 429/144
2008/0057390 A1    3/2008 Kondo et al.

FOREIGN PATENT DOCUMENTS

| JP | A-03-179669 | 8/1991 |
| JP | A-08-138724 | 5/1996 |
| JP | A-09-035724 | 2/1997 |
| JP | A-11-329501 | 11/1999 |
| JP | A-2008-084851 | 4/2008 |
| JP | A-2008-198490 | 8/2008 |
| JP | A-2008-310987 | 12/2008 |

OTHER PUBLICATIONS

Machine Translation of: JP 2008/310987, Kotani, Y., Dec. 25, 2008.*
International Search Report issued on Aug. 18, 2009 in International Application No. PCT/JP2009/058756 (with translation).

* cited by examiner

*Primary Examiner* — Kenneth Douyette
(74) *Attorney, Agent, or Firm* — Oliff & Berridge, PLC

(57) ABSTRACT

A method for producing a solid-state cell which makes it possible to produce a highly reliable solid-state cell that suppresses a decrease in the thickness of the solid electrolyte layer and a short circuit between the positive and negative electrodes, and which is highly flexible in the size and shape of the solid electrolyte layer and electrodes. The method comprising: a structure preparing step for preparing a first structure, a second structure, or a third structure, a solid electrolyte material powder layer, and a positive electrode material powder layer are stacked, in this sequence; an insulating member disposing step for disposing a heat-resistant insulating member which is in contact with an outer periphery of the structure in the stacking direction of the structure and surrounds the outer periphery; and a heat-compressing step for heat-compressing the structure and heat-resistant insulating member, in the stacking direction of the structure.

11 Claims, 4 Drawing Sheets

METHOD FOR PRODUCING A SOLID-STATE CELL AND A SOLID-STATE CELL

TECHNICAL FIELD

The present invention relates to a method for producing a solid-state cell and a solid-state cell.

BACKGROUND ART

In recent years, with the rapid spread of information-related devices and communication devices such as personal computers, video cameras and cellular phones, it has been regarded as important to develop a cell that is used as the power source of such devices. Also in the automobile industry, the development of a high-power and high-capacity cell for electric vehicles and hybrid vehicles has been promoted. Among various kinds of secondary cells, a lithium cell and a lithium-ion cell have been attracting attention because of their high energy density and output.

The lithium-ion cell, which is mainstream now, uses a combustible organic solvent as an electrolyte, however. Accordingly, safety measures against a possible liquid leak, short circuit, overcharge and so on are necessary. For improved safety, a solid lithium-ion cell that uses a solid electrolyte as an electrolyte, such as an ion-conducting polymer or ceramic, has been developed. Especially, sulfide-based inorganic solid electrolytes such as a sulfide glass and a crystallized sulfide glass have been attracting attention as the ceramics which are usable as the lithium-ion conducting solid electrolyte because of their high lithium-ion conductivity.

In general, solid-state cells typified by a solid lithium-ion cell comprise a positive electrode, a negative electrode, and a solid electrolyte layer disposed between the electrodes. The positive and negative electrodes are formed by using an electrode active material only or by using, in addition to an electrode active material, a solid electrolyte for imparting ion conductivity to the electrodes or an electroconductive material for imparting electroconductivity to the same. The solid electrolyte layer is formed by using a solid electrolyte only or by using, in addition to a solid electrolyte, a binder for imparting flexibility to the solid electrolyte layer, etc.

In the method for producing the electrodes of a solid-state cell, for example, as the method for forming the electrodes, there may be mentioned a method in which an electrode active material is mixed with a solid electrolyte, an electroconductive material, etc., as needed to prepare an electrode material powder, and the electrode material powder is press-formed by powder compacting. As the method for producing a solid electrolyte layer, there may be mentioned a method in which a solid electrolyte is mixed with a material such as a binder as needed to prepare an electrolyte material powder, and the electrolyte material powder is press-formed by powder compacting.

Methods other than the powder compacting method include, for example, a method in which the above-mentioned electrode material powder or electrolyte material powder is dispersed in a solvent to prepare a slurry, and the slurry is applied to a substrate (such as a removable substrate, an electrode or the like) and dried, thereby forming each electrode or a solid electrolyte layer.

Specific methods for producing a solid-state cell by powder compacting include, for example, methods disclosed in Patent Literatures 1 and 2.

Patent Literature 1 discloses a method for producing an all-solid-state lithium secondary cell by press-forming a solid electrolyte layer at a temperature that is equal to or less than the softening temperature of the solid electrolyte and equal to or more than the glass-transition temperature of the same. In Examples of Patent Literature 1, a solid electrolyte layer formed by press-forming a solid electrolyte powder is pressed under a heating condition in the state in which the layer is sandwiched between a positive electrode formed by press-forming a positive electrode powder prepared by mixing a solid electrolyte powder with a positive electrode active material, and a negative electrode formed by press-forming a negative electrode powder prepared by mixing a solid electrolyte powder with a negative electrode active material.

Patent Literature 2 discloses an all-solid-state lithium cell comprising a pair of electrode layers and a solid electrolyte layer, in which at least one of the pair of electrode layers and the solid electrolyte layer are integrated with an electrically insulating cylinder frame. In Examples of Patent Literature 2, an insulating tube made of polyethylene is fit to a cylinder of a forming die, and a positive material is put therein and formed by applying pressure; thereafter, a solid electrolyte powder is put therein and formed into a pellet by applying pressure. Then, a lithium foil, which will serve as the negative electrode, is press-bonded to the solid electrolyte side of the thus-obtained pellet.

PRIOR ART DOCUMENTS

Patent Literature

Patent Literature 1: Japanese Patent Application Laid-Open (JP-A) No. H08-138724
Patent Literature 2: JP-A No. H09-35724

SUMMARY OF INVENTION

Technical Problem

According to the method disclosed in Patent Literature 1, by press-forming the solid electrolyte layer when the electrolyte is softened, the solid electrolyte particles inside the solid electrolyte layer are connected to each other in surface contact, thereby forming a solid electrolyte layer with small grain boundary resistance.

By the method of Patent Literature 1, however, when pressed under the above heating condition, the softened solid electrolyte cannot be prevented from being leaked from between the positive and negative electrodes between which the solid electrolyte layer is sandwiched. As a result, a problem arises in which the thickness of the solid electrolyte layer becomes thinner than the designed thickness and, moreover, a short circuit is likely to occur between the positive and negative electrodes.

According to the method disclosed in Patent Literature 2, when the pellet formed in the die by applying pressure is removed from the die, it is possible to prevent the electrode material which constitutes the pellet from being in friction with the inner surface of the die and thus being scraped off. If the scraped electrode material attaches to the solid electrolyte layer of the pellet, it can cause an internal short circuit inside the cell. According to the method of Patent Literature 2, it is possible to suppress the occurrence of an internal short circuit inside the cell.

The method disclosed in Patent Literature 2, however, uses a die for press-forming; therefore, although it is suitable to produce a pellet-shaped small cell, it is not suitable to produce a cell which has a thin film- or sheet-shaped cell structure. Also in the production method disclosed specifically in Patent Literature 2, only the electrode material and solid electrolyte powder in the electrically insulating cylinder frame are pressed by a piston, and the cylinder frame is not pressed by the piston. Accordingly, upon pressing, the solid electrolyte powder can be leaked from a gap between the piston and the cylinder frame. As a result, a problem is likely to occur in which the thickness of the solid electrolyte layer becomes thinner than the designed thickness and, moreover, a short circuit is likely to occur between the positive and negative electrodes. In addition, in the technique disclosed in Patent Literature 2, a die has to be prepared each time to form the electrode layers and solid electrolyte layer which are different in size or shape. Also in the technique, since the cell is formed only by pressing without heating, it is difficult to obtain sufficient ion conductivity.

The present invention has been achieved in light of these circumstances, and an object of the present invention is to provide a method for producing a solid-state cell which makes it possible to produce a highly reliable solid-state cell that is able to suppress a decrease in the thickness of the solid electrolyte layer and a short circuit between the positive and negative electrodes, each of which is due to the softening of the solid electrolyte layer upon heat-compressing, and which is highly flexible in the size and shape of the solid electrolyte layer and electrodes and thus makes it possible to easily produce a sheet-shaped solid-state cell. Another object of the present invention is to provide a highly reliable, sheet-shaped solid-state cell.

Solution to Problem

The method for producing a solid-state cell according to the present invention is a method for producing a solid-state cell that comprises an electrolyte-electrode laminate having a negative electrode, a positive electrode and a solid electrolyte layer disposed between the negative and positive electrodes, which method comprising:

a structure preparing step for preparing a first structure in which a negative electrode material powder layer and a solid electrolyte material powder layer are stacked, a second structure in which a positive electrode material powder layer and a solid electrolyte material powder layer are stacked, or a third structure in which a negative electrode material powder layer, a solid electrolyte material powder layer, and a positive electrode material powder layer are stacked in this sequence;

an insulating member disposing step for disposing a heat-resistant insulating member which is in contact with an outer periphery of the structure in the stacking direction of the structure and surrounds the outer periphery; and a heat-compressing step for heat-compressing the structure and heat-resistant insulating member, at least an inner periphery of the heat-resistant insulating member and a region which is inside the inner periphery, in the stacking direction of the structure.

According to the present invention, in the heat-compressing step, the heat-resistant insulating member can prevent the solid electrolyte powder from being leaked from between the negative electrode material powder layer and the positive electrode material powder layer even if a pressure is applied to the solid electrolyte material powder layer in its stacking direction when it is softened. Also in the heat-compressing step, a region which extends beyond the boundary between the structure and the heat-resistant insulating member is heat-compressed, so that it is possible to prevent the solid electrolyte powder from being leaked from the boundary. Because of these reasons, according to the present invention, it is possible to provide a highly reliable solid-state cell which comprises an electrolyte-electrode laminate that is able to suppress a decrease in the thickness of the solid electrolyte layer and a short circuit between the positive and negative electrodes.

Also in the present invention, with respect to the first structure in which the negative electrode material powder layer and the solid electrolyte material powder layer are stacked, the second structure in which the positive electrode material powder layer and the solid electrolyte material powder layer are stacked, or the third structure in which the negative electrode material powder layer, the solid electrolyte material powder layer, and the positive electrode material powder layer are stacked, and with respect to the heat-resistant insulating member which surrounds the outer periphery of the structure, a heat-compression treatment is performed on at least the inner periphery of the heat-resistant insulating member and the region which is inside the inner periphery, in the stacking direction of the structure. Accordingly, the shape of the structure is determined by the heat-resistant insulating member. Because of this, the present invention is highly flexible in the shape and size of the electrolyte-electrode laminate, and it is thus easy to produce a solid-state cell which comprises, for example, a sheet-shaped electrolyte-electrode laminate having a large area. The electroconductive substrate is usable as the collector of each electrode, so that it is possible to efficiently produce an electrolyte-electrode laminate comprising a collector.

Specific embodiments of the method for producing a solid-state cell according to the present invention include an embodiment which comprises a structure preparing step for preparing a third structure in which a negative electrode material powder layer, a solid electrolyte material powder layer, and a positive electrode material powder layer are stacked in this sequence; an insulating member disposing step for disposing a heat-resistant insulating member which is in contact with an outer periphery of the structure in the stacking direction of the structure and surrounds the outer periphery; and a heat-compressing step for heat-compressing the structure and the heat-resistant insulating member in the stacking direction of the structure in the state that they are sandwiched between a first electroconductive substrate and a second electroconductive substrate in the stacking direction of the structure.

Among the specific embodiments, a preferred specific embodiment is an embodiment wherein, in the insulating member disposing step, the heat-resistant insulating member is disposed on the first electroconductive substrate; wherein, in the structure preparing step, the negative electrode material powder layer, a solid electrolyte material powder layer, and the positive electrode material powder layer are stacked on the first electroconductive substrate having the heat-resistant insulating member disposed thereon, thereby preparing a third structure; and wherein, in the heat-compressing step, the heat-resistant insulating member and structure which are disposed on the first electroconductive substrate are heat-compressed in the stacking direction of the structure in the state that they are sandwiched between the first electroconductive substrate and the second electroconductive substrate.

Preferably, the heat-resistant insulating member comprises an insulating material which is not softened at the heating temperature of the heat-compressing step. This is because the solid electrolyte can be more certainly prevented from being leaked from the positive electrode material powder layer and the negative electrode material powder layer when it is softened.

Also, the heat-resistant insulating member comprises a heat-resistant resin. This is because, in addition to the prevention of the solid electrolyte from being leaked, a uniform pressure can be applied to the structure due to the elasticity of the resin. By compressing the structure at a uniform pressure, it is possible to obtain an electrolyte-electrode laminate which is excellent in durability and reliability.

The method for producing a solid-state cell according to the present invention can further comprise an insulating member removing step for removing the heat-resistant insulating member after the heat-compressing step. Because of comprising such an insulating member removing step, it is possible to achieve a lightweight solid-state cell and increase the energy density of a solid-state cell.

The sheet-shaped solid-state cell produced by the method for producing a solid-state cell according to the present invention is a highly reliable solid-state cell which comprises a solid electrolyte layer having a layer thickness that is the same as the designed thickness, and which is resistant to short circuit.

Advantageous Effects of Invention

According to the present invention, it is possible to produce a highly reliable solid-state cell that is able to suppress a decrease in the thickness of the solid electrolyte layer and a short circuit between the positive and negative electrodes, each of which is due to the softening of the solid electrolyte layer upon heat-compressing. The present invention is highly flexible in the size and shape of the solid electrolyte layer and electrodes and thus makes it possible to easily produce a sheet-shaped solid-state cell. According to the present invention, therefore, a highly reliable, sheet-shaped solid-state cell is provided.

DESCRIPTION OF EMBODIMENTS

The method for producing a solid-state cell according to the present invention is a method for producing a solid-state cell that comprises an electrolyte-electrode laminate having a negative electrode, a positive electrode and a solid electrolyte layer disposed between the negative and positive electrodes, which method comprising:

a structure preparing step for preparing a first structure in which a negative electrode material powder layer and a solid electrolyte material powder layer are stacked, a second structure in which a positive electrode material powder layer and a solid electrolyte material powder layer are stacked, or a third structure in which a negative electrode material powder layer, a solid electrolyte material powder layer, and a positive electrode material powder layer are stacked in this sequence;

an insulating member disposing step for disposing a heat-resistant insulating member which is in contact with an outer periphery of the structure in the stacking direction of the structure and surrounds the outer periphery; and a heat-compressing step for heat-compressing the structure and heat-resistant insulating member, at least an inner periphery of the heat-resistant insulating member and a region which is inside the inner periphery, in the stacking direction of the structure.

Figure 1:
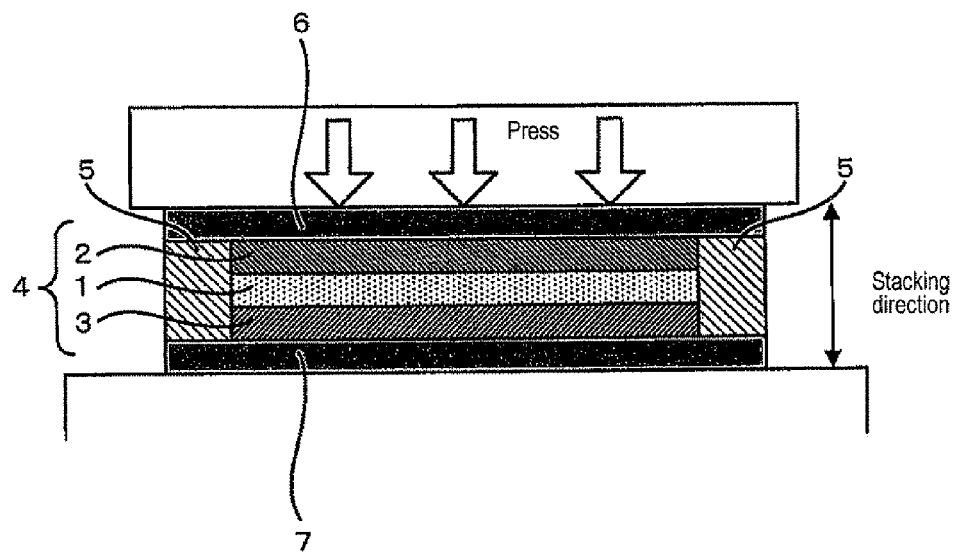
FIG. 1 is a sectional view showing the heat-compressing step of the method for producing a solid-state cell according to the present invention.
Figure 2:
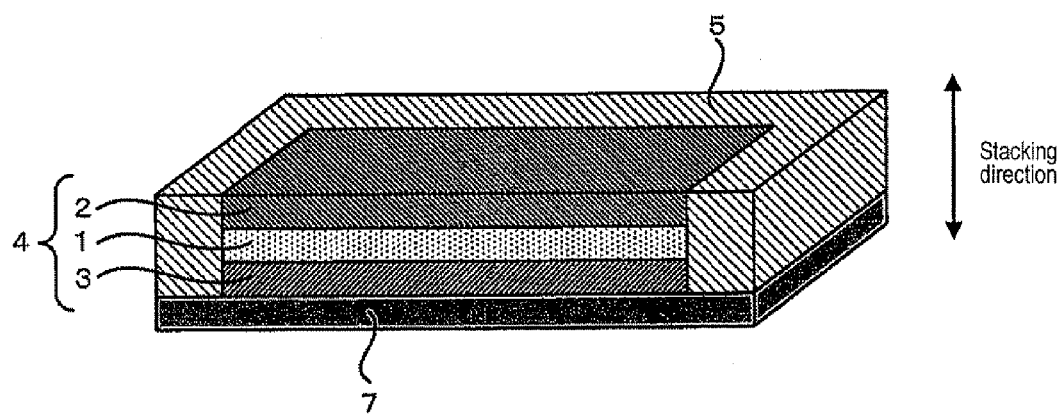
FIG. 2 is a perspective view of FIG. 1.
Figure 3:
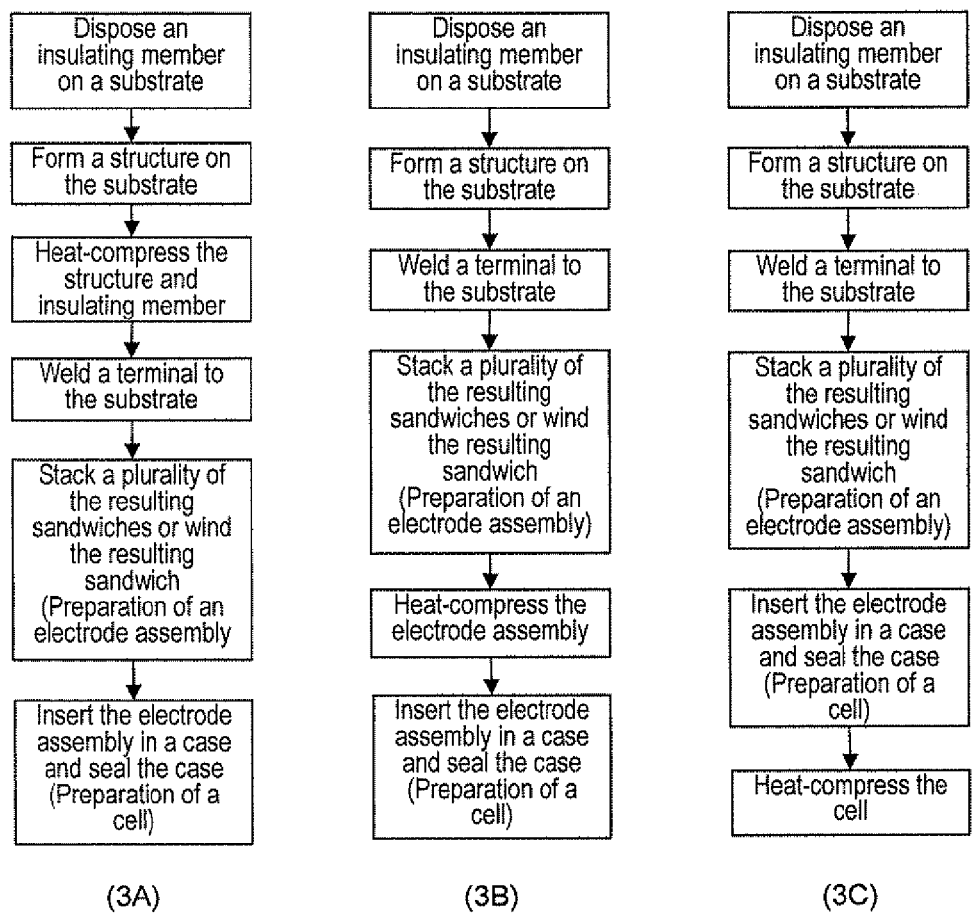
FIG. 3 is a view showing examples of a series of specific steps in the method for producing a solid-state cell according to the present invention.

Hereinafter, the method for producing a solid-state cell according to the present invention will be described with reference to FIGS. 1 to 4. FIG. 1 is a view that shows an embodiment of the heat-compressing step, and it is a sectional view that shows the arrangement of the structure, heat-resistant insulating member and electroconductive substrate. FIG. 2 is a perspective view of the structure, heat-resistant insulating member and electroconductive substrate of FIG. 1, in which an electroconductive substrate 6 is omitted for the sake of simplicity of explanation.

In the present invention, the first, second and third structures may be collectively referred to as "structure."

In the embodiments shown in FIGS. 1 and 2, in the heat-compressing step for heat-compressing a structure (third structure) 4 in which a negative electrode material powder layer 2, a solid electrolyte material powder layer 1 and a positive electrode material powder layer 3 are stacked in its stacking direction, a heat-resistant insulating member 5 is disposed to be in contact with an outer periphery of the structure 4 in the stacking direction of the structure and to surround the outer periphery. Furthermore, the structure 4 and the heat-resistant insulating member 5 are sandwiched between two electroconductive substrates 6 and 7 in the stacking direction of the structure 4. In the structure 4, the heat-resistant insulating member 5 and the electroconductive substrates 6 and 7 between which the structure and insulating member are sandwiched, a region which is inside the outer periphery of the heat-resistant insulating member 5 is heat-compressed. The heat-compressed structure 4 can be used in a solid-state cell as the electrolyte-electrode laminate which comprises a positive electrode, a negative electrode, and a solid electrolyte layer that is disposed between the electrodes.

As aforementioned, in the present invention, at the time of heat-compressing, the heat-resistant insulating member 5 is disposed at the outer periphery of the structure 4 in the stacking direction of the structure which comprises the solid electrolyte material powder layer 1. Because of this, even if a pressure is applied to the structure 4 in its stacking direction, the solid electrolyte which is softened by the heating in the solid electrolyte material powder layer 1 is less likely to leak from the outer periphery of the structure 4. In the heat-compressing step, furthermore, in the structure 4 and the heat-resistant insulating member 5, an inner periphery of the heat-resistant insulating member 5 (a part where the heat-resistant insulating member 5 is in contact with the outer periphery of the structure 4) and the region which is inside the inner periphery, that is, the region which extends beyond the boundary between the structure 4 and the heat-resistant insulating member 5 are heat-compressed. Because of this, unlike the case where heat-compression is performed on only the region which is inside the inner periphery of the heat-resistant insulating member 5, the solid electrolyte softened by the heating is less likely to leak from the boundary between the structure 4 and the heat-resistant insulating member 5. According to the production method of the present invention, therefore, it is possible to prevent a decrease in the thickness of the solid electrolyte layer due to the leak of the solid electrolyte. Also, it is possible to prevent an internal short circuit due to a decrease in the thickness of the solid electrolyte layer in the electrolyte-electrode laminate.

Also in the production method of the present invention, with respect to the structure 4 and the heat-resistant insulating member 5 which surrounds the outer periphery of the structure 4, a heat-compression treatment is performed on at least the inner periphery of the heat-resistant insulating member and the region which is inside the inner periphery in the stacking direction of the structure. Accordingly, the shape of the structure is determined by the heat-resistant insulating member. That is, in the present invention, the shape of the outer periphery of the structure can be determined by controlling the shape of the inner periphery of the heat-resistant insulating member (a part which is in contact with the outer periphery of the structure in the stacking direction of the structure). Because of this, compared to the case of using a die, the production method of the present invention is more highly flexible in the shape and size of the resulting electrolyte-electrode laminate. In addition, unlike the case of using a die, it is not necessary to prepare a new die each time to change the shape of the desired electrolyte-electrode laminate, so that the production cost of the electrolyte-electrode laminate is expected to be reduced. For example, according to the present invention, it is easy to produce a sheet-shaped solid-state cell which has a large area and is suitable for automobile applications.

The electroconductive substrate is usable as the collector of each electrode. According to the present invention, therefore, it is possible to efficiently produce an electrolyte-electrode laminate which comprises a collector.

Hereinafter, the steps of the method for producing a solid-state cell according to the present invention will be described in detail.

(1) Structure Preparing Step

In the present invention, to prevent the solid electrolyte material powder layer from being leaked at the time of heat-compressing, any of the first to third structures in which at least one of the negative electrode material powder layer and the positive electrode material powder layer, and the solid electrolyte material powder layer are stacked, is heat-compressed in the state of being surrounded by the heat-resistant insulating member.

The structure preparing step is a step for preparing any one of the first structure in which the negative electrode material powder layer and the solid electrolyte material powder layer are stacked, the second structure in which the positive electrode material powder layer and the solid electrolyte material powder layer are stacked, and the third structure in which the negative electrode material powder layer, the solid electrolyte material powder layer, and the positive electrode material powder layer are stacked in this sequence.

The negative electrode material powder layer comprises a material that constitutes the negative electrode (negative electrode material), and it is heat-compressed in the heat-compressing step to be the negative electrode. As the negative electrode material, a negative electrode active material can be used solely, or a negative electrode active material can be used in combination with a solid electrolyte, an electroconductive material, etc., appropriately as needed.

No particular limitation is imposed on the specific negative electrode active materials, solid electrolytes and electroconductive materials which are usable in the present invention. For example, as the negative electrode active material for lithium-ion cells and lithium cells, there may be mentioned lithium metal, lithium alloys such as Li—Al alloy and Li—In alloy, lithium titanates such as $Li_4Ti_5O_{12}$, carbon materials such as carbon fiber and graphite, etc.

The shape and size of the negative electrode active material are not particularly limited; however, the average particle diameter is preferably 0.02 to 20 μm, particularly preferably 0.05 to 15 μm. In the present invention, the average particle diameter of each material can be measured by, for example, a particle size distribution measuring apparatus, more specifically, by Microtrac particle size analyzer MT3300EXII (product name; manufactured by: NIKKISO Co., Ltd.)

As the solid electrolyte for lithium-ion cells and lithium cells, for example, there may be mentioned a sulfide inorganic solid electrolyte such as $(Li_3PO_4)x-(Li_2S)y-(SiS_2)z$ glass, $(Li_2S)x-(SiS_2)y$ glass, $(Li_2S)x—(P_2S_5)y$ glass, and a crystallized glass obtained by partly crystallizing any of these glasses, a NASICON-type oxide-based inorganic solid electrolyte such as $LiTi_2(PO_4)_3$, $LiZr_2(PO_4)_3$ and $LiGe_2(PO_4)_3$, a perovskite-type oxide inorganic solid electrolyte such as $(La_{0.5+x}Li_{0.5-3x})TiO_3$, etc.

In the case of using an inorganic solid electrolyte, the shape and size of the inorganic solid electrolyte is not particularly limited; however, the average particle diameter is preferably 0.02 to 20 μm, particularly preferably 0.05 to 10 μm.

In the structure preparing step, a sulfide glass such as $(Li_3PO_4)x-(Li_2S)y-(SiS_2)z$ glass, $(Li_2S)x-(SiS_2)y$ glass and $(Li_2S)x-(P_2S_5)y$ glass can be used as the solid electrolyte, and then the sulfide glass can be crystallized utilizing the successive heat-compressing step. It is known that crystallized glass generally shows higher lithium ion conductivity than glass. A preliminarily crystallized glass can be used in the structure preparing step; however, depending on the heating condition and pressing condition of the heat-compressing step, it is possible to crystallize a sulfide glass and thus to simplify the production step or to reduce the production cost.

As the electroconductive material, there may be mentioned an electroconductive carbon particle, an electroconductive carbon fiber, a carbon nanotube, etc. The shape and size of the electroconductive material is not particularly limited; however, the long axis diameter is preferably 0.05 to 10 μm, particularly preferably 0.1 to 2 μm.

The negative electrode material powder layer can be formed by forming a coating film of a negative electrode material prepared by mixing the above materials at a desired ratio by a coating film forming method such as a printing method (inkjet method, screen printing, die coating, etc.), deposition, sputtering, laser ablation, gas deposition, aero deposition, and electrostatic screening. The thickness of the negative electrode material powder layer is not particularly limited; however, it is preferable that the thickness is 0.1 to 100 μm, particularly preferably 2 to 60 μm, after the heat-compressing step.

The positive electrode material powder layer comprises a material that constitutes the positive electrode (a positive electrode material), and it is heat-compressed in the heat-compressing step to be the positive electrode. As the positive electrode material, a positive electrode active material can be used solely, or a positive electrode active material can be used appropriately in combination with a solid electrolyte, an electroconductive material, etc., as needed.

No particular limitation is imposed on the specific positive electrode active materials, solid electrolytes and electroconductive materials which are usable in the present invention. For example, as the positive electrode active material for lithium-ion cells and lithium cells, there may be mentioned transition metal chalcogenides such as titanium disulfide, molybdenum disulfide and niobium selenide, transition metal oxides such as lithium nickel oxide ($LiNiO_2$), lithium manganese oxide ($LiMnO_2$, $LiMn_2O_4$) and lithium cobalt oxide ($LiCoO_2$), etc.

The shape and size of the positive electrode active material are not particularly limited; however, the average particle diameter is preferably 0.02 to 20 μm, particularly preferably 0.05 to 15 μm.

As the solid electrolytes and electroconductive materials which are usable as the positive electrode material for lithium ion cells and lithium cells, there may be mentioned those that are described above as the negative electrode material.

The positive electrode material powder layer can be formed by forming a coating film of a positive electrode material prepared by mixing the above materials at a desired ratio by a coating film forming method such as a printing method (inkjet method, screen printing, die coating, etc.), deposition, sputtering, laser ablation, gas deposition, aero deposition and electrostatic screening. The thickness of the positive electrode material powder layer is not particularly limited; however, it is preferable that the thickness is 0.1 to 100 μm, particularly preferably 2 to 60 μm, after the heat-compressing step.

The solid electrolyte material powder layer comprises at least a solid electrolyte, and it is heat-compressed in the heat-compressing step to be the solid electrolyte layer. The solid electrolyte material powder layer can contain a solid electrolyte only, or a solid electrolyte can be appropriately mixed with other component(s) such as a binder as needed in the solid electrolyte material powder layer.

No particular limitation is imposed on the specific solid electrolytes and binders which are usable in the present invention. For example, as the solid electrolyte for lithium-ion cells and lithium cells, there may be mentioned those that are described above as the negative electrode material.

As the binder, for example, there may be mentioned a binder resin which comprises at least one of Si, P and N, such as a silicone-based polymer and a phosphazene polymer, a binder resin which contains no unsaturated bond such as a polystyrene, a polyethylene, an ethylene-propylene polymer and a styrene-butadiene polymer, etc.

The solid electrolyte material powder layer can be formed by forming a coating film of a solid electrolyte material prepared by mixing the above materials at a desired ratio by a coating film forming method such as a printing method (inkjet method, screen printing, die coating, etc.), deposition, sputtering, laser ablation, gas deposition, aero deposition and electrostatic screening. The thickness of the solid electrolyte material powder layer is not particularly limited; however, it is preferable that the thickness is 0.1 to 100 μm, particularly preferably 1 to 50 μm, after the heat-compressing step.

No particular limitation is imposed on the method for preparing the first structure by stacking the negative electrode material powder layer and the solid electrolyte material powder layer, the method for preparing the second structure by stacking the positive electrode material powder layer and the solid electrolyte material powder layer, and the method for preparing the third structure by stacking the negative electrode material powder layer, the solid electrolyte material powder layer and the positive electrode material powder layer. For example, as the method for preparing the first structure, there may be mentioned a method in which on the electroconductive substrate, the negative electrode material powder layer and the solid electrolyte material powder layer are formed in this sequence from closest to the electroconductive substrate by the above-mentioned coating film forming method. Similarly, as the method for preparing the second structure, there may be mentioned a method in which on the electroconductive substrate, the positive electrode material powder layer and the solid electrolyte material powder layer are formed in this sequence from closest to the electroconductive substrate by the above-mentioned coating film forming method.

As the method for preparing the third structure, for example, there may be mentioned a method in which on the electroconductive substrate, the negative electrode material powder layer, the solid electrolyte material powder layer and the positive electrode material powder layer are formed in this sequence (the negative electrode material powder layer, the solid electrolyte material powder layer and the positive electrode material powder layer from closest to the electroconductive substrate, or the positive electrode material powder layer, the solid electrolyte material powder layer and the negative electrode material powder layer from closest to the electroconductive substrate) by the above-mentioned coating film forming method.

The third structure can be also formed by stacking a first electroconductive substrate having the negative electrode material powder layer formed thereon and a second electroconductive substrate having the positive electrode material powder layer and solid electrolyte material powder layer formed thereon in this sequence from closest to the second electroconductive substrate. Similarly, the third structure can be formed by stacking a first electroconductive substrate having the negative electrode material powder layer and solid electrolyte layer formed thereon in this sequence from closest to the first electroconductive substrate and a second electroconductive substrate having the positive electrode material powder layer formed thereon.

As any of the methods for preparing the first structure, the second structure and the third structure, a method can be employed in which the negative electrode material powder layer, the solid electrolyte material powder layer and the positive electrode material powder layer are formed on a transfer substrate by the above-mentioned coating film forming method, and then the layers are transferred and stacked onto the electroconductive substrate.

No particular limitation is imposed on the electroconductive substrate usable in the present invention, as long as they are electroconductive and can serve as the collector of each electrode. For example, there may be mentioned SUS, copper, nickel, titanium, aluminum, etc. The thickness of the electroconductive substrate is preferably about 5 to 20 μm.

The two electroconductive substrates (the first and second electroconductive substrates) between which the third structure (electrolyte-electrode laminate) is sandwiched in the heat-compressing step can be formed with different materials, or they can be formed with an identical material. Among the two electroconductive substrates between which the third structure is sandwiched, the first electroconductive substrate can be the positive electrode side, and the second electroconductive substrate can be the negative electrode side. Alternatively, the first electroconductive substrate can be the negative electrode side, and the second electroconductive substrate can be the positive electrode side.

In the present invention, in the case of using the first structure as the structure, an electrolyte-electrode laminate can be obtained by stacking the positive electrode on the solid electrolyte layer side of the negative electrode-solid electrolyte layer laminate obtained through the heat-compressing step. At this time, it is preferable that the positive electrode to be stacked is formed by heat-compressing the positive electrode material powder layer in the state where the heat-resistant insulating member is disposed to be in contact with the outer periphery of the layer. More specifically, it is preferable to use a positive electrode that is obtained in such a manner that with respect to the positive electrode material powder layer and the heat-resistant insulating member which is disposed to be in contact with the outer periphery of the positive electrode material powder layer and to surround the outer periphery, a heat-compression treatment is performed on the inner periphery of the heat-resistant insulating member and the region which is inside the inner periphery of the insulating member.

Similarly, in the case of using the second structure, an electrolyte-electrode laminate can be obtained by stacking the negative electrode on the solid electrolyte layer side of the positive electrode-solid electrolyte layer laminate obtained through the heat-compressing step. At this time, it is preferable that the negative electrode to be stacked is formed by heat-compressing the negative electrode material powder layer in the state where the heat-resistant insulating member is disposed to be in contact with the outer periphery of the layer. More specifically, it is preferable to use a negative electrode that is obtained in such a manner that with respect to the negative electrode material powder layer and the heat-resistant insulating member which is disposed to be in contact with the outer periphery of the negative electrode material powder layer and to surround the outer periphery, a heat-compression treatment is performed on the inner periphery of the heat-resistant insulating member and the region which is inside the inner periphery of the insulating member.

In the present invention, the third structure is preferred as the structure. This is because an electrolyte-electrode laminate which is excellent in adhesion between the layers can be obtained, and compared with the case of using the first or second structure, it is possible to simplify the production process of the electrolyte-electrode laminate.

(2) Insulating Member Disposing Step

The insulating member disposing step is a step for disposing the heat-resistant insulating member so as to be in contact with the outer periphery of the structure prepared in the structure preparing step in the stacking direction of the structure, and so as to surround the outer periphery.

The sequence of the insulating member disposing step and the structure preparing step is not limited. After the structure preparing step, the heat-resistant insulating member can be disposed at the outer periphery of the thus-prepared structure (structure preparing step→insulating member disposing step). Alternatively, after the heat-resistant insulating member is disposed in the insulating member disposing step, the structure can be prepared inside the inner periphery of the heat-resistant insulating member so as to be in contact with and surrounded by the heat-resistant insulating member (insulating member disposing step→structure preparing step).

No particular limitation is imposed on the constituent material of the heat-resistant insulating member as long as the material can ensure the electrical insulation between the positive and negative electrodes, and general heat-resistant insulating materials can be used.

"Heat-resistant" used herein refers to property of not being softened under a condition of 150° C.

Preferably, the heat-resistant insulating material is not softened at the heating temperature of the heat-compressing step. This is because the solid electrolyte can be more certainly prevented from being leaked at the time of heat-compressing, and an all-solid-state cell that is more highly reliable can be obtained. The heating temperature of the heat-compressing step is appropriately determined depending on the solid electrolyte that constitutes the structure, so that heat resistance required for the heat-resistant insulating material also varies depending on the condition of the heat-compressing step. In general, the melting point of the heat-resistant insulating material is preferably 150° C. or more, more preferably 200° C. or more, still more preferably 250° C. or more.

As the heat-resistant insulating material, for example, there may be mentioned a heat-resistant resin material and an insulating ceramic material.

More specifically, as the heat-resistant resin material for example, there may be mentioned an aliphatic polyamide such as nylon 6 (melting point: 222° C.), nylon 46 (melting point: 290° C.) and nylon 66 (melting point: 262° C.), a polyester resin such as polybutylene terephthalate (melting point: 224° C.), polyethylene terephthalate (melting point: 256° C.) and polycyclohexanedimethylene terephthalate (melting point: 290° C.), a super engineering plastic such as polyether ether ketone (melting point: 334° C.), etc.

Also as the heat-resistant resin material, there may be used commercial products including a semiaromatic polyamide such as RENY (product name) manufactured by Mitsubishi Gas Chemical Company, Inc. (melting point: 243° C.), HT Nylon (product name) manufactured by Toray Industries, Inc. (melting point: 290° C.), Arlen (product name) manufactured by Mitsui Chemicals, Inc. (melting point: 320° C.), Amodel (product name) manufactured by Solvay Advanced Polymers K.K. (melting point: 312° C.), Zytel HTN (product name) manufactured by Dupont (melting point: 300° C.), etc.

As the insulating ceramic material, there may be mentioned MgO and $Al_2O_3$, for example.

Preferably, the heat-resistant insulating member is formed with a heat-resistant resin. This is because in the heat-compressing step, while preventing the solid electrolyte from being leaked from the solid electrolyte layer to the outer periphery of the structure, a uniform pressure can be applied to the structure due to the elasticity of the resin. By compressing the structure at a uniform pressure, it is possible to obtain an electrolyte-electrode laminate which is more excellent in durability and reliability.

The method for disposing the heat-resistant insulating member is not particularly limited and can be appropriately selected depending on the heat-resistant insulating material to be used or on the sequence of the insulating member disposing step and the structure preparing step. For example, a specific example thereof is such that a heat-resistant insulating material is applied on one surface of an electroconductive substrate by hot-melt coating, an electrostatic coating method, a spraying method, a cold spraying method, an aerosol deposition method or the like to form a heat-resistant insulating member in a desired shape and thickness. Also, there may be mentioned a method in which a resin member in a desired shape is stacked on one surface of an electroconductive substrate and then subjected to a pressing treatment at a temperature which is higher than the softening temperature of the resin to fuse the resin member onto the electroconductive substrate.

As mentioned above, in the production method of the present invention, the shape of the electrolyte-electrode laminate is determined by the shape of the inner periphery of the heat-resistant insulating member which is in contact with the outer periphery of the structure in the stacking direction of the structure and surrounds the same. Accordingly, the heat-resistant insulating member can be designed and disposed according to the shape of a desired electrolyte-electrode laminate. It is preferable that the height of the heat-resistant insulating member in its stacking direction (the height in the stacking direction of the structure) is the same as the height of the structure in its stacking direction after the heat-compressing step. That is, normally before the heat-compressing step, the height of the structure in its stacking direction is higher the height of the heat-resistant insulating member in its stacking direction.

Also as mentioned above, no particular limitation is imposed on the sequence of the structure preparing step and the insulating member disposing step; however, it is preferable that after the heat-resistant insulating member is disposed, the structure is prepared inside the heat-resistant insulating member so that the inner periphery of the heat-resistant insulating member is in contact with the outer periphery of the structure. This is because the structure is not affected by heating in the heat-resistant insulating member disposing step.

For example, in the case of preparing the third structure in the structure preparing step, it is preferable to form the structure in such a manner that the heat-resistant insulating member is disposed on an electroconductive substrate (the first electroconductive substrate) in the insulating member disposing step; thereafter, in the structure preparing step, the negative electrode material powder layer, the solid electrolyte layer and the positive electrode material powder layer are stacked on the first electroconductive substrate having the heat-resistant insulating member disposed thereon.

In this embodiment, the first electroconductive substrate having the structure formed thereon and having the insulating member disposed thereon is then heat-compressed in the state in which the first and second electroconductive substrates are stacked so that the structure and the insulating member are sandwiched therebetween.

(3) Heat-Compressing Step

The heat-compressing step is a step for heat-compressing the structure and heat-resistant insulating member, at least the inner periphery of the heat-resistant insulating member and the region which is inside the inner periphery, in the stacking direction of the structure.

As just described, by applying a pressure to the region of the structure and heat-resistant insulating member, which extends beyond the boundary between the structure and the heat-resistant insulating member, the pressure is applied to both of the structure and the heat-resistant insulating member upon heat-compressing. As a result, it is possible to prevent the solid electrolyte which constitutes the structure from being leaked from the boundary between the structure and the heat-resistant insulating member. Also, it is advantageous in that a uniform pressure can be applied to the structure in its plane direction (in the plane direction of the layers that constitute the structure).

If the region of the structure and heat-resistant insulating member, which is subjected to heat-compression in the heat-compressing step, contains at least the region that is inside the inner periphery of the heat-resistant insulating member and that contains the inner periphery itself, it is possible to prevent the solid electrolyte from being leaked from the aforementioned boundary between the structure and the heat-resistant insulating member in the heat-compressing step. Normally, it is preferable to press the region with a pressing surface which has an outer periphery that is larger than the inner periphery of the heat-resistant insulating member. Typically, it is preferable to press the region with a pressing surface which has an outer periphery that is equal to or larger than the outer periphery of the heat-resistant insulating member.

The object of the heat-compression is not limited to the structure and the heat-resistant insulating member. For example, in addition to the structure and the heat-resistant insulating member themselves (see 3A in FIG. 3), heat-compression can be performed on an electrode assembly produced by stacking or winding a plurality of a set of electroconductive substrates between which the structure and the heat-resistant insulating member are sandwiched and to which a terminal is welded (see 3B in FIG. 3), or heat-compression can be performed on a cell produced by inserting an electrode assembly in a case and sealing the case (see 3C in FIG. 3).

As mentioned above, the third structure is preferred as the structure from the viewpoint of the adhesion between the layers of the thus-obtained electrolyte-electrode laminate and from the viewpoint of simplifying the step for producing the electrolyte-electrode laminate. Because it is more certainly possible to prevent the leak of the solid electrolyte material, and from the viewpoint of simplifying the step for producing the electrolyte-electrode laminate further, it is preferable that the third structure and the heat-resistant insulating member are heat-compressed in the state of being sandwiched between two electroconductive substrates in the stacking direction of the structure.

In the heat-compressing step, the heating temperature is not particularly limited as long as the solid electrolyte which is contained in the solid electrolyte material powder layer of the structure can be softened at the heating temperature. By pressing the structure when the solid electrolyte is softened, the solid electrolyte particles inside the solid electrolyte layer are thus brought into surface contact with each other. As a result, compared with the case of pressing the structure when the solid electrolyte is not softened, it is possible to decrease the resistance of the solid electrolyte layer and thus to increase the ion conductivity.

The inventors of the present invention found out that compared with the case of not employing the heat-compressing step, it is possible to obtain a decrease of, specifically, 10 to 20% in the resistance. The resistance decreasing effect by heat-compression can be obtained in all of the processes shown in FIG. 3.

That is, the heating temperature of the heat-compressing step can be appropriately determined depending on the softening temperature of the solid electrolyte that is contained in the solid electrolyte material powder layer. In general, the heating temperature is preferably 100° C. or more, more preferably 200° C. or more, and still more preferably 220° C. or more. On the other hand, from the viewpoint of a decrease in the ion conductivity and production of a crystalline phase, the heating temperature is preferably 300° C. or less, more preferably 280° C. or less, and still more preferably 250° C. or less.

The pressure applied in the heat-compressing step is not limited to a specific pressure as long as the resistance of the solid-state cell can be thus decreased. In general, the pressure is preferably 0.1 to 10 ton/cm$^2$, more preferably 0.2 to 8 ton/cm$^2$, still more preferably 0.3 to 4 ton/cm$^2$.

The heat-compressing time is not particularly limited; however, under the above-mentioned heating temperature and pressure conditions, it is preferable that the time is normally 0.5 to 10 minutes.

The methods for welding a terminal, preparing an electrode assembly, and inserting the electrode assembly, in a case and sealing it will be described below.

(4) Insulating Member Removing Step

The method for producing a solid-state cell according to the present invention can further comprise the insulating member removing step for removing the heat-resistant insulating member after the heat-compressing step.

The heat-resistant insulating member can be left as it is to ensure the insulation between the positive and negative electrodes in a solid-state cell. By removing the heat-resistant insulating member, however, it is possible to achieve a lightweight solid-state cell and increase the energy density per unit weight of a solid-state cell.

Figure 4:
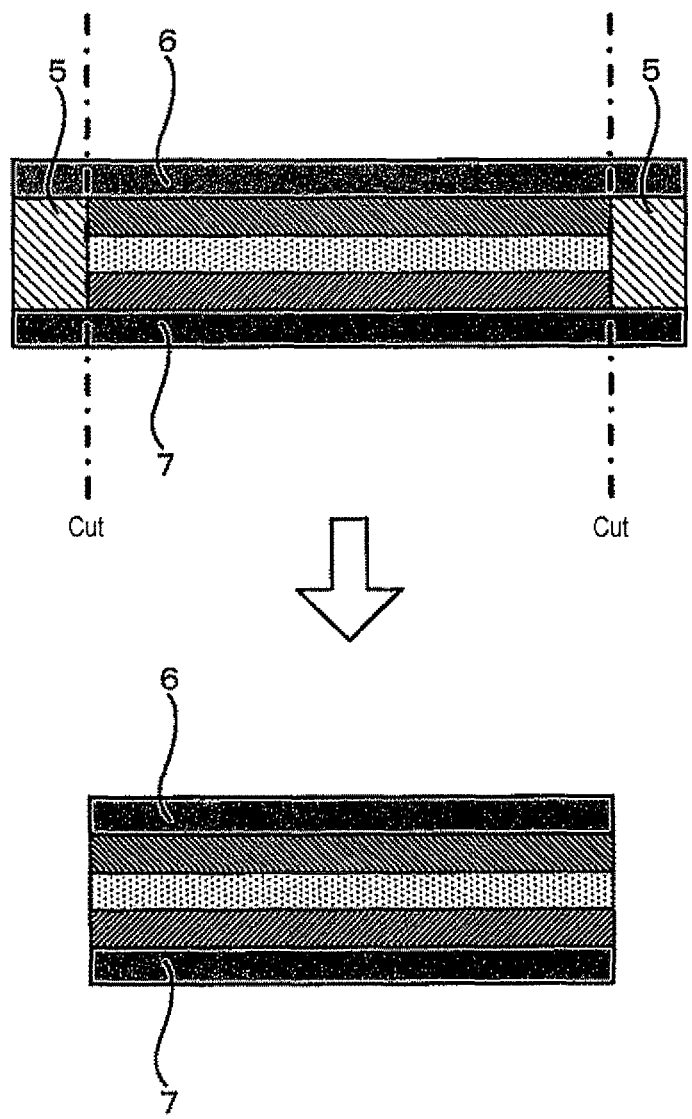
FIG. 4 is a view showing an example of the method for removing the heat-resistant insulating member.

As the method for removing the heat-resistant insulating member, for example, there may be mentioned a method in which, as shown in FIG. 4, among the structure and heat-resistant insulating member sandwiched between the two electroconductive substrates, the region at which the heat-resistant insulating member is disposed is cut for removal, as well as the electroconductive substrates between which the region is disposed. The heat-resistant insulating member can be removed at any time after the heat-compression and until the insertion of the laminate into a case.

(5) Other Steps

The method for producing a solid-state cell of the present invention can comprise a step other than the above steps. Herein, a step for welding a terminal to each of the electroconductive substrates which function as collectors, a step for preparing a electrode assembly (stacking or winding step), and a step for inserting the electrode assembly into a case and sealing it (cell preparing step) will be described.

A general method can be employed in any of the welding step, the step for preparing a electrode assembly and the step for inserting and sealing the same.

In the step for welding a terminal to each of the electroconductive substrates which function as collectors, an electroconductive member which will be a terminal is welded to each of the electroconductive substrates by a general method. As the electroconductive member which will be a terminal, there may be mentioned copper, aluminum, nickel, SUS, etc. The mounting position, number, etc., of the terminal can be appropriately determined.

In the step for preparing a electrode assembly, the third structures or electrolyte-electrode laminates each of which is sandwiched between the two electroconductive substrates are stacked by a general method, or the third structure or electrolyte-electrode laminate is wound by a general method. A solid-state cell with a desired capacity can be obtained by employing such a stacking or winding structure.

The electrode assembly obtained in the step for preparing a electrode assembly is inserted into a cell case, and the case is sealed. A general material can be used as the material for the cell case, and a general shape, structure and method can be employed as the shape and structure of the cell case, the method for inserting the electrode assembly into the cell case, and the method for sealing the cell case after inserting the electrode assembly.

As aforementioned, the heat-compressing step can be performed before or after the electrode assembly is prepared, or after the electrode assembly is inserted into a case, and the case is sealed.

By the above-mentioned method of the present invention for preparing a solid-state cell, for example, it is possible to easily produce a sheet-shaped solid-state cell which comprises a sheet-shaped solid electrolyte layer because the shape of the solid electrolyte layer is highly flexible in this method. In addition, it is possible to produce a solid-state cell which comprises a solid electrolyte layer having a layer thickness that is the same as the designed thickness; thus, it is possible to prevent the occurrence of an internal short circuit due to a decrease in the thickness of the solid electrolyte layer. According to the present invention, therefore, a highly reliable solid-state cell is obtained.

EXAMPLES

Example 1

Figure 5:
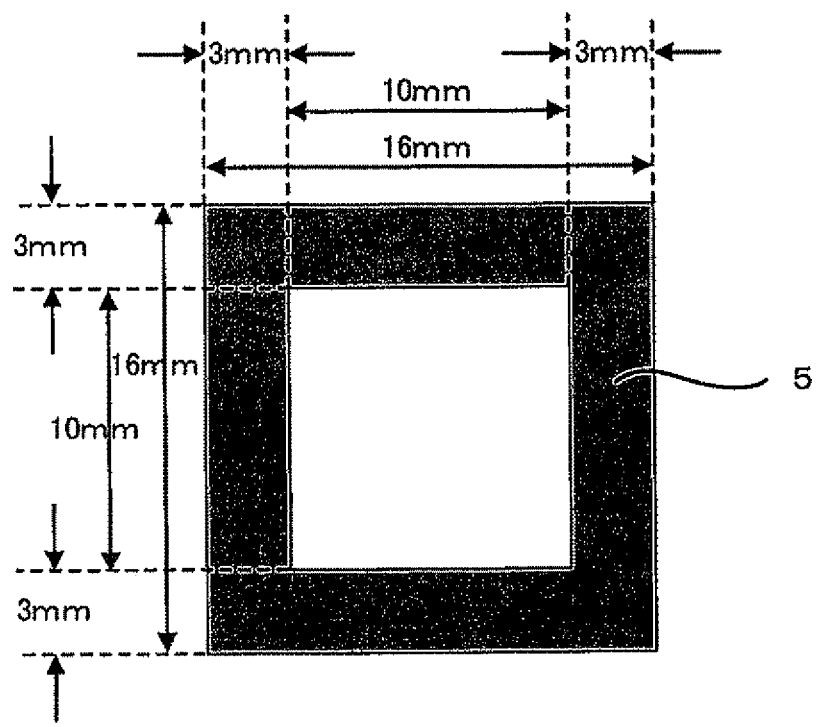
FIG. 5 is a plan view showing the configuration of the heat-resistant insulating member in Examples of the present invention.

A coating film of polyether ether ketone was formed in the shape shown in FIG. 5 (a 3 mm wide and 50 μm thick pattern circumscribed about a 10 mm square rectangular and inscribed in a 16 mm square rectangular) on one surface of a (16 mm square) aluminum foil by hot-melt printing (deposition of a heat-resistant insulating member).

Next, a powder mixture of $LiNiO_2$ and $Li_2S$—$P_2S_5$ crystallized glass ($LiNiO_2$:$Li_2S$—$P_2S_5$ crystallized glass=70:30 vol %) was applied to the inside of the heat-resistant insulating member (a 10 mm square rectangular area) on the aluminum foil by an electrostatic screen method, thereby forming a positive electrode material powder layer. At this time, the thickness of the positive electrode material powder layer was designed to be 50 μm after the successive heat-compressing step.

Then, the thus-obtained aluminum foil having the heat-resistant insulating member disposed thereon and having the positive electrode material powder layer formed thereon was heat-compressed with a pressing surface having a size of 10 mm square or more at 2 ton/cm² and 230° C. for 10 minutes, thereby obtaining a laminate A.

Meanwhile, a coating film of polyether ether ketone was formed in the shape shown in FIG. 5 (a 3 mm wide and 80 μm thick pattern circumscribed about a 10 mm square rectangular and inscribed in a 16 mm square rectangular) on one surface of a (16 mm square) copper foil by hot-melt printing (deposition of a heat-resistant insulating member).

Next, a powder mixture of $Li_4Ti_5O_{12}$ and $Li_2S$—$P_2S_5$ crystallized glass ($Li_4Ti_5O_{12}$:$Li_2S$—$P_2S_5$ crystallized glass=70:30 vol %) was applied to the inside of the heat-resistant insulating member (a 10 mm square rectangular area) on the copper foil by an electrostatic screen method, thereby forming a negative electrode material powder layer. At this time, the thickness of the negative electrode material powder layer was designed to be 50 μm after the successive heat-compressing step.

In addition, $Li_2S$—$P_2S_5$ crystallized glass powder was applied onto the negative electrode material powder layer inside the heat-resistant insulating member (a 10 mm square rectangular area) by an electrostatic screen method, thereby forming a solid electrolyte material powder layer. At this time, the thickness of the solid electrolyte material powder layer was designed to be 30 μm after the successive heat-compressing step.

Then, the thus-obtained copper foil having the heat-resistant insulating member disposed thereon and having the negative electrode material powder layer and solid electrolyte material powder layer disposed thereon was heat-compressed with a pressing surface having a size of 10 mm square or more at 2 ton/cm² and 230° C. for 10 minutes, thereby obtaining a laminate B.

The thus-obtained laminates A and B were stacked on each other to obtain a cell structure in which an electrolyte-electrode laminate was sandwiched between two collectors (aluminum foil/positive electrode/solid electrolyte layer/negative electrode/copper foil). Five cell structures (samples 1 to 5) were prepared by using the same materials and the same method as above.

The thus-obtained cell structures were evaluated for the thickness of the electrolyte-electrode laminate and for the occurrence of a short circuit upon the operation of the cell. The results are shown in Table 1.

The thickness of each electrolyte-electrode laminate was measured by SEM observation of the cross-section of the laminate. The occurrence of a short circuit was evaluated by measuring the self-discharge of each cell structure after each cell-structure was charged and checking whether or not an abnormal self-discharge was observed.

Example 2

A coating film of polyether ether ketone was formed in the shape shown in FIG. 5 (a 3 mm wide and 50 μm thick pattern circumscribed about a 10 mm square rectangular and inscribed in a 16 mm square rectangular) on one surface of a (16 mm square) aluminum foil by hot-melt printing (deposition of a heat-resistant insulating member).

Next, a powder mixture of $LiNiO_2$ and $Li_2S$—$P_2S_5$ crystallized glass ($LiNiO_2$:$Li_2S$—$P_2S_5$ crystallized glass=70:30 vol %) was applied to the inside of the heat-resistant insulating member (a 10 mm square rectangular area) on the aluminum foil by an electrostatic screen method, thereby forming a positive electrode material powder layer. At this time, the thickness of the positive electrode material powder layer was designed to be 50 µm after the successive heat-compressing step.

Meanwhile, a coating film of polyether ether ketone was formed in the shape shown in FIG. 5 (a 3 mm wide and 80 µm thick pattern circumscribed about a 10-mm-square rectangular and inscribed in a 16-mm-square rectangular) on one surface of a (16 mm square) copper foil by hot-melt printing (deposition of a heat-resistant insulating member).

Next, a powder mixture of $Li_4Ti_5O_{12}$ and $Li_2S$—$P_2S_5$ crystallized glass ($Li_4Ti_5O_{12}$:$Li_2S$—$P_2S_5$ crystallized glass=70:30 vol %) was applied to the inside of the heat-resistant insulating member (a 10 mm square rectangular area) on the copper foil by an electrostatic screen method, thereby forming a negative electrode material powder layer. The thickness of the negative electrode material powder layer was designed to be 50 µm after the successive heat-compressing step.

In addition, $Li_2S$—$P_2S_5$ crystallized glass powder was applied onto the negative electrode material powder layer inside the heat-resistant insulating member (a 10 mm square rectangular area) by an electrostatic screen method, thereby forming a solid electrolyte material powder layer. At this time, the thickness of the solid electrolyte material powder layer was designed to be 30 µm after the successive heat-compressing step.

Then, the aluminum foil having the heat-resistant insulating member disposed thereon and having the positive electrode material powder layer formed thereon, and the copper foil having the heat-resistant insulating member disposed thereon and having the negative electrode material powder layer and solid electrolyte formed thereon, were stacked on each other so that the positive electrode material powder layer, the solid electrolyte material powder layer and the negative electrode material powder layer were sandwiched between the aluminum and copper foils. The resulting sandwich was heat-compressed with a pressing surface having a size of 10 mm square or more at 2 ton/cm$^2$ and 230° C. for 10 minutes, thereby obtaining a cell structure in which an electrolyte-electrode laminate was sandwiched between two collectors (aluminum foil/positive electrode/solid electrolyte layer/negative electrode/copper foil). Five cell structures (samples 1 to 5) were prepared by using the same materials and the same method as above. The thus-obtained cell structures were evaluated in the same manner as in Example 1 for the thickness of the electrolyte-electrode laminate and for the occurrence of a short circuit upon the operation of the cell. The results are shown in Table 1.

Comparative Example 1

Five cell structures (samples 1 to 5) were prepared in the same manner as in Example 2 except that no heat-resistant insulating member was disposed on one surface of the aluminum foil and that of the copper foil. In the same manner as in Example 2, the thus-obtained cell structures were evaluated for the thickness of the electrolyte-electrode laminate and for the occurrence of a short circuit upon the operation of the cell. The results are shown in Table 1.

TABLE 1

| | Sample No. | Thickness of electrolyte-electrode laminate (µm) | Occurrence of short circuit |
|---|---|---|---|
| Example 1 | 1 | 133 | No |
| | 2 | 132 | No |
| | 3 | 131 | No |
| | 4 | 129 | No |
| | 5 | 128 | No |
| Example 2 | 1 | 130 | No |
| | 2 | 131 | No |
| | 3 | 125 | No |
| | 4 | 132 | No |
| | 5 | 128 | No |
| Comparative Example 1 | 1 | 83 | Yes |
| | 2 | 91 | Yes |
| | 3 | 88 | No |
| | 4 | 82 | No |
| | 5 | 90 | Yes |

Table 1 shows that in the cell structures of Comparative Example 1 each of which was prepared by not disposing the heat-resistant insulating member, the thicknesses of the electrolyte-electrode laminates, which were designed to be 130 µm, were in the range of 82 to 91 µm, resulting in a significant decrease in the thickness. In Comparative Example 1, moreover, a short circuit occurred in three of the five cell structure.

In contrast, in the cell structures of Examples and 2 which were produced by the production method according to the present invention, the thicknesses of the electrolyte-electrode laminates of Example 1 and those of Example 2 were in the range of 128 to 133 µm and 125 to 132 µm, respectively, and the thicknesses are almost the same as the designed thickness. In addition, no short circuit occurred in all of the five cell structures of Example 1 and those of Example 2.

REFERENCE SIGNS LIST

1. Solid electrolyte material powder layer
2. Negative electrode material powder layer
3. Positive electrode material powder layer
4. Structure
5. Heat-resistant insulating member
6. First electroconductive substrate
7. Second electroconductive substrate

The invention claimed is:
1. A method for producing a solid-state cell that comprises an electrolyte-electrode laminate having a negative electrode, a positive electrode and a solid electrolyte layer disposed between the negative and positive electrodes, the method comprising:
   a structure preparing step for preparing a structure, wherein the structure is selected from the group consisting of
      a first structure in which a negative electrode material powder layer and a solid electrolyte material powder layer are stacked,
      a second structure in which a positive electrode material powder layer and a solid electrolyte material powder layer are stacked, and
      a third structure in which a negative electrode material powder layer, a solid electrolyte material powder layer, and a positive electrode material powder layer are stacked in this sequence;
   an insulating member disposing step for disposing a heat-resistant insulating member which is in contact with an outer periphery of the structure in the stacking direction of the structure and surrounds the outer periphery; and a heat-compressing step for heat-compressing the structure and heat-resistant insulating member, at least an inner periphery of the heat-resistant insulating member and a region which is inside the inner periphery, in the stacking direction of the structure, with a pressing surface which has an outer periphery that is larger than the inner periphery of the heat-resistant insulating member and which has a flat surface.

2. The method for producing a solid-state cell according to claim 1, wherein the heat-resistant insulating member comprises an insulating material which is not softened at the heating temperature of the heat-compressing step.

3. The method for producing a solid-state cell according to claim 1, wherein the heat-resistant insulating member comprises a heat-resistant resin.

4. The method for producing a solid-state cell according to claim 1, which method further comprising an insulating member removing step for removing the heat-resistant insulating member after the heat-compressing step.

5. A sheet-shaped solid-state cell produced by the method for producing a solid-state cell defined by claim 1.

6. A method for producing a solid-state cell that comprises an electrolyte-electrode laminate having a negative electrode, a positive electrode and a solid electrolyte layer disposed between the negative and positive electrodes, the method comprising:

a structure preparing step for preparing a third structure in which a negative electrode material powder layer, a solid electrolyte material powder layer, and a positive electrode material powder layer are stacked in this sequence;

an insulating member disposing step for disposing a heat-resistant insulating member which is in contact with an outer periphery of the third structure in the stacking direction of the third structure and surrounds the outer periphery; and a heat-compressing step for heat-compressing the third structure and the heat-resistant insulating member, at least an inner periphery of the heat-resistant insulating member and a region which is inside the inner periphery, in the stacking direction of the third structure, with a pressing surface which has an outer periphery that is larger than the inner periphery of the heat-resistant insulating member and which has a flat surface, in the state that the third structure and the heat-resistant insulating member are sandwiched between a first electroconductive substrate and a second electroconductive substrate in the stacking direction of the third structure.

7. The method for producing a solid-state cell according to claim 6, wherein, in the insulating member disposing step, the heat-resistant insulating member is disposed on the first electroconductive substrate;

wherein, in the structure preparing step, the negative electrode material powder layer, a solid electrolyte material powder layer, and the positive electrode material powder layer are stacked on the first electroconductive substrate having the heat-resistant insulating member disposed thereon, thereby preparing the third structure; and wherein, in the heat-compressing step, the heat-resistant insulating member and the third structure which are disposed on the first electroconductive substrate are heat-compressed in the stacking direction of the third structure in the state that they are sandwiched between the first electroconductive substrate and the second electroconductive substrate.

8. The method for producing a solid-state cell according to claim 6, wherein the heat-resistant insulating member comprises an insulating material which is not softened at the heating temperature of the heat-compressing step.

9. The method for producing a solid-state cell according to claim 6, wherein the heat-resistant insulating member comprises a heat-resistant resin.

10. The method for producing a solid-state cell according to claim 6, wherein the method further comprises an insulating member removing step for removing the heat-resistant insulating member after the heat-compressing step.

11. A sheet-shaped solid-state cell produced by the method for producing a solid-state cell defined by claim 6.

* * * * *